US011885104B2

(12) United States Patent
Pause

(10) Patent No.: US 11,885,104 B2
(45) Date of Patent: Jan. 30, 2024

(54) HYDRAULIC HYBRID SYSTEM FOR A WORK MACHINE AND A METHOD OF CONTROLLING THE HYDRAULIC HYBRID SYSTEM

(71) Applicant: VOLVO CONSTRUCTION EQUIPMENT AB, Eskilstuna (SE)

(72) Inventor: Valentin Pause, Konz (DE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 332 days.

(21) Appl. No.: 17/045,977

(22) PCT Filed: Apr. 27, 2018

(86) PCT No.: PCT/EP2018/060985
§ 371 (c)(1),
(2) Date: Oct. 7, 2020

(87) PCT Pub. No.: WO2019/206434
PCT Pub. Date: Oct. 31, 2019

(65) Prior Publication Data
US 2021/0363729 A1    Nov. 25, 2021

(51) Int. Cl.
*E02F 9/22* (2006.01)
*F15B 21/08* (2006.01)
(Continued)

(52) U.S. Cl.
CPC .......... *E02F 9/2217* (2013.01); *E02F 9/2075* (2013.01); *E02F 9/2235* (2013.01);
(Continued)

(58) Field of Classification Search
CPC ..... E02F 9/2217; E02F 9/2075; E02F 9/2235; F15B 1/024; F15B 1/033; F15B 21/087;
(Continued)

(56) References Cited

U.S. PATENT DOCUMENTS 9,458,604 B2 * 10/2016 Zhang .................... E02F 9/2292
10,100,847 B2 * 10/2018 Wu .......................... F15B 11/08
(Continued)

FOREIGN PATENT DOCUMENTS

WO    WO 2013/106431 A2    7/2013
WO    WO 2014/165361 A1    10/2014
WO    WO 2014/196905 A1    12/2014
WO    WO 2015/117965 A1    8/2015

OTHER PUBLICATIONS

International Search Report and Written Opinion of the International Searching Authority, PCT/EP2018/060985, dated Jan. 3, 2019, 12 pages.

*Primary Examiner* — Dustin T Nguyen
(74) *Attorney, Agent, or Firm* — Sage Patent Group

(57) ABSTRACT

The invention relates to a hydraulic system for a work machine. The system comprising: a main hydraulic machine connected to an output shaft of an engine of the work machine for providing power to working hydraulics of the work machine; a main pressure line connecting the main hydraulic machine to the working hydraulics; a support hydraulic machine connected to the output shaft; a hydraulic accumulator; a discharge valve connected between the accumulator and an input side of the support hydraulic machine; a charge valve connected between an output side of the support hydraulic machine and the hydraulic accumulator to selectively allow a flow from the support hydraulic machine to the hydraulic accumulator; a flow support valve connected between the output side of the support hydraulic machine and the main pressure line to selectively allow a flow from the support hydraulic machine to the main pressure line; and a hydraulic tank connected to the input side of the support hydraulic machine.

14 Claims, 5 Drawing Sheets

(51) Int. Cl.
*F15B 1/02* (2006.01)
*E02F 9/20* (2006.01)
*F15B 1/033* (2006.01)

(52) U.S. Cl.
CPC .............. *F15B 1/024* (2013.01); *F15B 1/033* (2013.01); *F15B 21/087* (2013.01); *F15B 2211/20523* (2013.01); *F15B 2211/20546* (2013.01); *F15B 2211/20576* (2013.01); *F15B 2211/212* (2013.01); *F15B 2211/6658* (2013.01); *F15B 2211/88* (2013.01); *Y02T 10/62* (2013.01)

(58) Field of Classification Search
CPC .. F15B 2211/20523; F15B 2211/20546; F15B 2211/20576; F15B 2211/212; F15B 2211/6658; F15B 2211/88; Y02T 10/62
See application file for complete search history.

(56) References Cited

U.S. PATENT DOCUMENTS

| | | | |
|---|---|---|---|
| 10,167,835 B2* | 1/2019 | Dölger | F02N 7/00 |
| 10,337,538 B2* | 7/2019 | Matsuzaki | E02F 9/22 |
| 11,274,417 B2* | 3/2022 | Kondo | F15B 21/14 |
| 2007/0186548 A1* | 8/2007 | Smith | F15B 21/14 |
| | | | 60/413 |
| 2008/0060857 A1 | 3/2008 | Knestrick et al. | |
| 2013/0004281 A1 | 1/2013 | Anders et al. | |
| 2013/0098012 A1* | 4/2013 | Opdenbosch | F15B 1/024 |
| | | | 60/413 |
| 2014/0166114 A1 | 6/2014 | Wang et al. | |
| 2015/0045167 A1 | 2/2015 | Lee et al. | |
| 2016/0238041 A1* | 8/2016 | Kajita | E02F 9/123 |
| 2016/0281745 A1 | 9/2016 | Shang et al. | |

* cited by examiner

HYDRAULIC HYBRID SYSTEM FOR A WORK MACHINE AND A METHOD OF CONTROLLING THE HYDRAULIC HYBRID SYSTEM

CROSS REFERENCE TO RELATED APPLICATIONS

This application is a 35 U.S.C. § 371 national stage application of PCT International Application No. PCT/EP2018/060985 filed on Apr. 27, 2018, the disclosure and content of which is incorporated by reference herein in its entirety.

TECHNICAL FIELD

The invention relates to a hydraulic system for a work machine and to a method of controlling the hydraulic system.

The invention is applicable on work machines within the fields of industrial construction machines, material handling machines or construction equipment, in particular excavators. Although the invention will be described with respect to an excavator, the invention is not restricted to this particular machine, but may also be used in other work machines such as articulated haulers, wheel loaders and backhoe loaders.

BACKGROUND

In connection with construction work, work machines are frequently used. A work machine may be operated with large and heavy loads in areas where there are no roads, for example for transports in connection with road or tunnel building, sand pits, mines and similar environments.

To improve the fuel efficiency of the work machine, a hybrid drive system comprising an energy storage can be used. For example, a hydraulic hybrid system typically consists of a hydraulic machine acting as a pump/motor attached to the gearbox and a hydraulic system based on hydraulic accumulators and control valves. The energy storage system can be charged when excess energy is available, for example during braking by producing the braking torque with the pump/motor and charging the accumulator with pressurized oil. The energy can then later on be reused.

In excavators comprising a hydraulic system for providing power to working hydraulics of the excavator, the hydraulic flow to the working hydraulics may be generated by a variable pump connected to a diesel engine. The maximum flow depends directly on the engine speed while the maximum pump capacity is limited by different reasons like costs, space or efficiency of the hydraulic pump. Load cycles in excavators can be very dynamic with high peak loads. Therefore, it may be necessary for specific operating conditions and tasks to choose a relatively high engine speed in order to sufficiently to cover the hydraulic flow required at the peak load. However, an average engine load of an excavator is typically rather low, such as in the range of 50 to 70%. To cover the peak load while reducing the average engine speed it would be helpful to store energy provided by the diesel engine while the requested work load is low and to use it when high power is needed.

Accordingly, there is a need for a system where the engine speed can be reduced in order to improve the fuel efficiency of the work machine.

SUMMARY

An object of the invention is to provide a hydraulic hybrid system for a work machine configured to reduce the engine speed of the work machine by using a hydraulic accumulator to provide power to working hydraulics of the work machine.

According to a first aspect of the invention, the object is achieved by a hydraulic system for a work machine. The hydraulic system comprising: a main hydraulic machine connected to an output shaft of an engine of the work machine for providing power to working hydraulics of the work machine; a main pressure line connecting the main hydraulic machine to the to working hydraulics of the work machine; a support hydraulic machine connected to the output shaft; a hydraulic accumulator; a discharge valve connected between the accumulator and an input side of the support hydraulic machine; a charge valve connected between an output side of the support hydraulic machine and the accumulator to selectively allow a flow from the support hydraulic machine to the accumulator; a flow support valve connected between the output side of the support hydraulic machine and the main pressure line to selectively allow a flow from the support hydraulic machine to the main pressure line; and a hydraulic tank connected to the input side of the support hydraulic machine.

The main hydraulic machine is a hydraulic machine connected to the output shaft of the engine and which is typically capable of being operated both as a pump to provide power to the working hydraulics and as a motor for regenerating power from the working hydraulics. Moreover, the main hydraulic machine may advantageously be a variable displacement hydraulic machine. The support hydraulic machine is directly coupled to the engine output shaft without any intermediate gears or transmission arrangement. However, it is in principle also possible to connect the support hydraulic machine to a power take-off (PTO) of an engine. Each of the main hydraulic machine and the support hydraulic machine is connected to the main pressure line. The engine output shaft may also be referred to as the crankshaft of the engine.

The described valves of the hydraulic system are named by their respective general function. Accordingly, the discharge valve is arranged to discharge the hydraulic accumulator and to control a flow of hydraulic fluid from the hydraulic accumulator to the input side of the hydraulic machine, the charge valve is arranged between the output side of the hydraulic machine and the accumulator to allow charging of the accumulator, and the flow support valve is arranged to allow a flow of hydraulic fluid to the working hydraulics, primarily from the support hydraulic machine.

Moreover, the hydraulic tank connected to the input side of the support hydraulic machine allows the support hydraulic machine to operate as a suction pump transferring and pressurizing hydraulic fluid from the tank to provide to the main pressure line.

By means of the described system, the support hydraulic machine and the accumulator can be used to provide hydraulic power and flow to the work hydraulics when required, in turn making it possible to reduce the engine speed required at peak loads and to increase the average engine load in the direction of the optimal working point of the engine, where the engine is in part used to charge the accumulator. By reducing the engine speed, it may also be possible to reduce parasitic losses of auxiliary drives powered by the engine. Auxiliary drives may for example be pilot pump, steering pump, alternator, fan drive etc. Such drives are commonly designed to perform sufficiently well at idle engine speed. As a result of the mechanical connection to the crankshaft, they may therefore "overperform" at higher speeds. Lowering these parasitic losses also reduces fuel consumption. This will significantly increase the fuel efficiency of the machine. Moreover, the reduced engine speed at peak loads also results in a lower noise level of the working machine, which is an important factor in many situation where the working machine is operating. The described improvements can be achieved by employing a control methodology which will be discussed in further detail in the following.

Furthermore, the main pressure line can be supplied with flow simultaneously by two different sources, i.e. the accumulator and the tank, which extends the maximum available flow beyond the capacity of only the main hydraulic machine.

According to one embodiment of the invention, the support hydraulic machine may advantageously be a variable displacement hydraulic machine. Thereby, the flow and power output of the support hydraulic machine can be controlled. Moreover, as a result of the variable displacement of the support hydraulic machine, flow and pressure through the hydraulic machine can be transformed without throttling in all operating modes, i.e. if the accumulator is being charged, discharged or when flow support is provided from tank.

According to one embodiment of the invention, the hydraulic system may further comprise a main control valve connecting the main pressure line to the working hydraulics. The main control valve may comprise a valve arrangement configured to provide power to one or more working hydraulic functions. The working hydraulic functions may be hydraulic cylinders used for steering or lifting or other types of hydraulic machinery.

According to one embodiment of the invention, the charge valve may be a bidirectional valve, and the discharge valve and flow support valve may be unidirectional valves. By providing the charge valve as a unidirectional valve is not only possible to control charging of the accumulator, it is also possible to provide a hydraulic flow to the main pressure line from the accumulator, via the flow support valve, without going through the support hydraulic machine.

According to a second aspect of the invention, the object is achieved by a method for controlling a hydraulic system of a work machine. The hydraulic system comprising: a main hydraulic machine connected to an output shaft of an engine of the work machine for providing power to working hydraulics of the work machine; a main pressure line connecting the main hydraulic machine to working hydraulics of the work machine; a support hydraulic machine connected to the output shaft; a hydraulic accumulator; a discharge valve connected between the accumulator and an input side of the support hydraulic machine; a charge valve connected between an output side of the support hydraulic machine and the accumulator to selectively allow a flow from the support hydraulic machine to the accumulator; a flow support valve connected between the output side of the support hydraulic machine and the main pressure line to selectively allow a flow from the support hydraulic machine to the main pressure line; and a hydraulic tank connected to the input side of the support hydraulic machine.

The method for controlling the hydraulic system comprises: controlling the hydraulic system to operate in a flow support mode, a power boost mode or a charging mode, wherein the flow support mode comprises opening the flow support valve, closing the discharge valve and charge valve, and operating the support hydraulic machine as a pump to provide a hydraulic flow from the tank to the main pressure line; wherein the power boost mode comprises opening the discharge valve and the flow support valve and closing the charge valve, and if the pressure on the main hydraulic line is higher than the pressure of the accumulator, operating the support hydraulic machine as a pump, and if the pressure on the main hydraulic line is lower than the pressure of the accumulator, operating the support hydraulic machine as a motor; wherein the charging mode comprises closing the discharge valve and the flow support valve and opening the charge valve, and operating the support hydraulic machine as a pump to charge the accumulator.

According to one embodiment of the invention, the method may further comprise controlling the hydraulic system to be in the flow support mode if an engine load is lower than a maximum load and when a requested hydraulic flow is higher than a maximum hydraulic flow of the main hydraulic machine. The engine provides power to the support hydraulic machine which in turn pressurizes hydraulic fluid from the tank, and the pressurized hydraulic fluid is subsequently provided to the main pressure line via the flow support valve. Thereby, the size of the main hydraulic machine may be reduced since the maximum flow is the sum of flows from the main and support hydraulic machines.

According to one embodiment of the invention, the method may further comprise controlling the hydraulic system to be in the charging mode if a current engine load is lower than a maximum engine load and when a requested hydraulic flow is lower than a maximum hydraulic flow of the main hydraulic machine. Accordingly, if the accumulator is below full charge, the accumulator may be charged when there is available engine capacity and when there is no need for flow support.

According to one embodiment of the invention, operating the hydraulic system in a power boost mode further comprises, if the pressure in the main pressure line is higher than the pressure of the accumulator, operating the support hydraulic machine to increase the pressure of the hydraulic fluid received from the accumulator to the pressure of the main pressure line. If the pressure in the main pressure line is higher than the pressure of the accumulator, the hydraulic flow from the accumulator need to be pressurized by the support hydraulic machine acting as a pump before reaching the main pressure line. To operate the support hydraulic machine as a pump, an additional torque is required on the output shaft for powering the support hydraulic machine.

According to one embodiment of the invention, operating the hydraulic system in a power boost mode may further comprise, if the pressure in the main pressure line is higher than the pressure of the accumulator, decreasing the displacement of the main hydraulic machine. Accordingly, if the additional torque required for powering the support hydraulic machine cannot be provided by the engine, the torque requirement of the main hydraulic machine can be reduced with an amount corresponding to the torque requirement of the support hydraulic machine by reducing the displacement of the main hydraulic machine. Thereby, the torque provided by the engine can be kept substantially constant. Moreover, since the input side (suction side) of the support hydraulic machine is connected to the accumulator with a pressure higher than the tank pressure, the support hydraulic machine requires less torque to generate a certain amount of flow compared to the main hydraulic machine. Thereby, by using the support hydraulic machine and the accumulator, an increased flow can be achieved while keeping the output torque from the engine constant.

According to one embodiment of the invention, operating the hydraulic system in a power boost mode further comprises controlling a power output by the support hydraulic machine by controlling a swivel angle of the support hydraulic machine. An effect of this is that the accumulator can be discharged just by the amount of power required to boost the system supply. This would not be possible with a fixed displacement support hydraulic machine, as the amount of power obtained from the accumulator would depend on the engine speed solely (due to mechanical connection). This would result either in unnecessary low engine load or throttling of the flow from the accumulator. Using a variable displacement unit allows to utilize the energy stored in the accumulator in an efficient manner.

According to one embodiment of the invention method may further comprise operating the hydraulic system in a start/stop mode, where the discharge valve and the flow support valves are opened and the charge valve is closed, and wherein the support hydraulic machine is operated as a motor propelling the output shaft of the engine to start the engine. During starting of the engine, the flow is released to the tank via an unload valve. Thereby, fuel efficiency can be improved since the accumulator can be utilized to start the engine.

There is further provided a computer program comprising program code means for performing the steps of any of the aforementioned embodiments when the program is run on a computer, and a computer readable medium carrying a computer program comprising program code means for performing the steps of any of the aforementioned embodiments when the program product is run on a computer.

Additional effects and features of this second aspect of the present invention are largely analogous to those described above in connection with the first aspect of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

In the present detailed description, various embodiments of a hydraulic system and a method for controlling a hydraulic system according to the present invention are mainly discussed with reference to a hydraulic system configured to be arranged in an excavator. It should be noted that this by no means limits the scope of the present invention which is equally applicable to other types of working machines.

Figure 1:
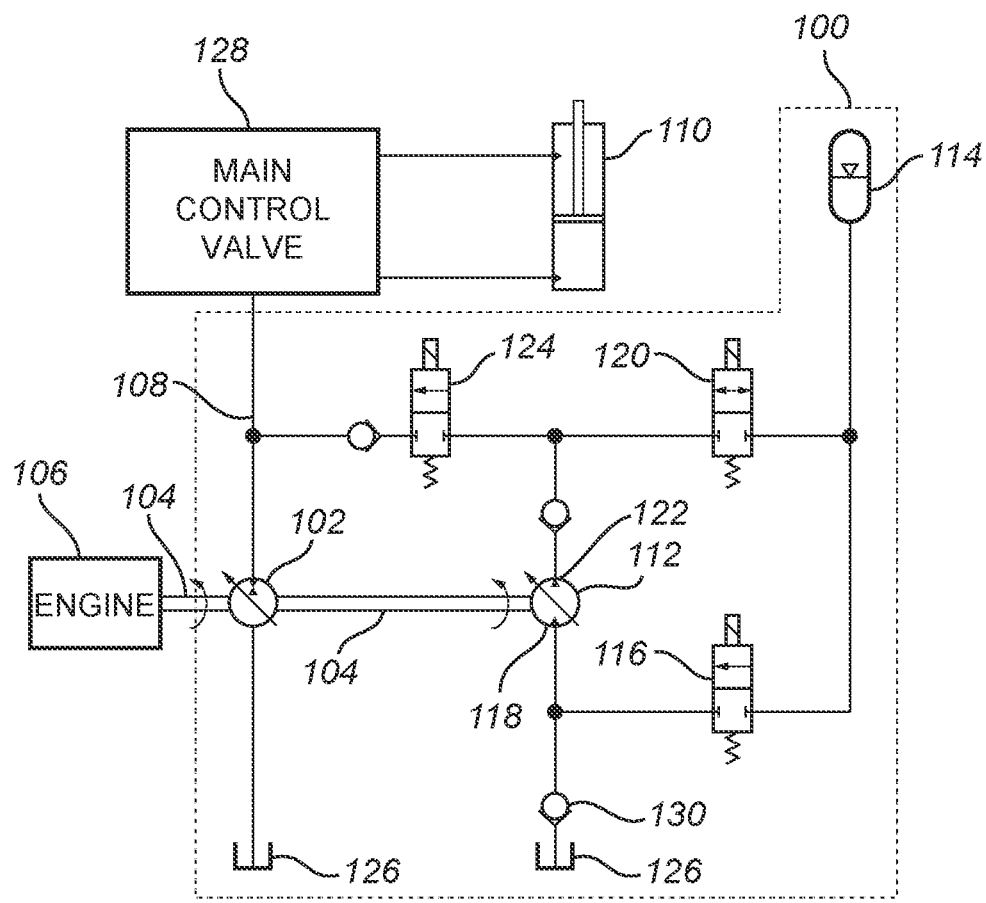
FIG. 1 schematically illustrates a hydraulic system for a work machine according to an embodiment of the invention.

FIG. 1 schematically illustrates a hydraulic system 100 for a work machine according to an embodiment of the invention. The hydraulic system 100 comprises a main hydraulic machine 102 connected to an output shaft 104 of an engine 106 of the work machine for providing power to working hydraulics 110 of the work machine. The main hydraulic machine 102 is advantageously a variable displacement hydraulic machine 102 connected to a crankshaft 104 of an internal combustion engine 106.

The hydraulic system 100 further comprises a main pressure line 108 connecting the main hydraulic machine 102 to the working hydraulics 110 of the work machine via a main control valve 128. The working hydraulics may comprise lifting cylinders of an excavator or wheel loader, steering cylinders, hydraulically powered tools and the like, and the main control valve 128 is adapted to control hydraulic flow to the various hydraulic functions. Moreover, the pressure in the main pressure line may be referred to as the system pressure Furthermore, the hydraulic system 100 comprises a support hydraulic machine 112 which is also connected to the output shaft 104, in series with the main hydraulic machine 102. The support hydraulic machine 112 is coupled to the main pressure line 108 and to a hydraulic accumulator 114 via a valve arrangement. The valve arrangement comprises a discharge valve 116 connected between the hydraulic accumulator 114 and an input side 118 of the support hydraulic machine 112, a charge valve 120 connected between an output side 122 of the support hydraulic machine 112 and the accumulator 114 to selectively allow a flow from the support hydraulic machine 112 to the hydraulic accumulator 114, and flow support valve 124 connected between the output side 122 of the support hydraulic machine 112 and the main pressure line 108 to selectively allow a flow from the support hydraulic machine 112 to the main pressure line 108. Even though the valves 120, 124, 126 are here illustrated as individual valves, the described functionality may equally well be achieved by an appropriately configured valve block.

The system further comprises a hydraulic tank 126 connected to the input side 118 of the support hydraulic machine 112. Since the hydraulic accumulator 114 is also connected to the input side 118 of the support hydraulic machine 112, a check valve 130 is arranged between the input side 118 of the support hydraulic machine 112 and the tank 126, and between the point where the accumulator 114 connects to the input side 118 of the support hydraulic machine 112, to prevent a flow from the hydraulic accumulator 114 to the tank 126. With the inclusion of a hydraulic accumulator 114, the described hydraulic system 100 may also be referred to as a hybrid hydraulic system where the hydraulic accumulator 114 can be used to power the working hydraulics 110, and where energy may be recuperated from the working hydraulics 110 by means of the accumulator 114.

Figure 2:
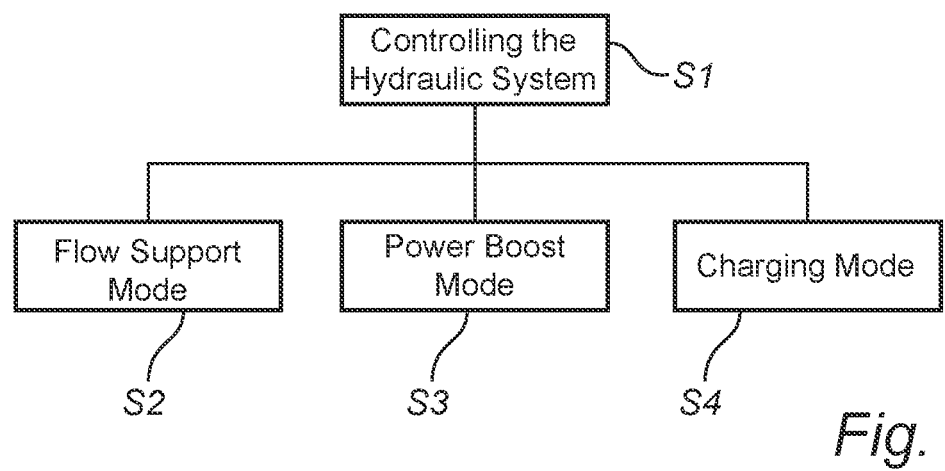
FIG. 2 is a flow chart outlining the general steps of a method for controlling the described hydraulic system according to an embodiment of the invention.
Figure 3:
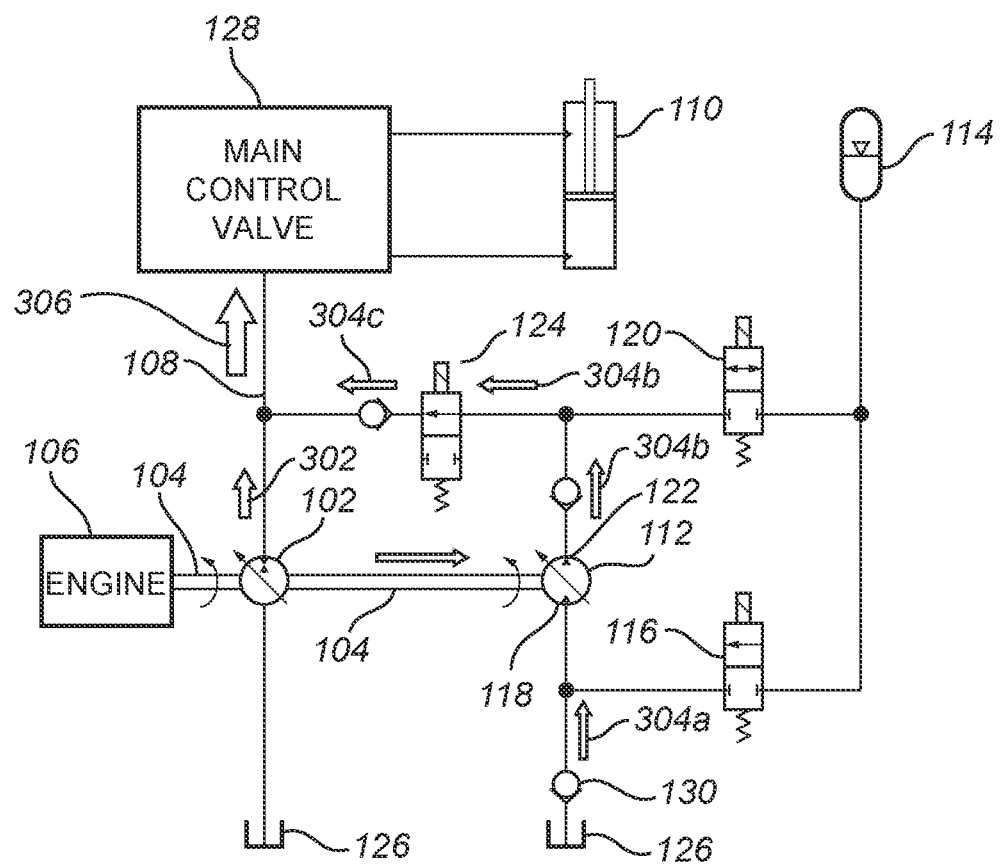
FIG. 3 schematically illustrates an operating mode of a hydraulic system according to an embodiment of the invention.

FIG. 2 is a flow chart outlining the general steps of a method for controlling the described hydraulic system 100. The method will be discussed with further reference to FIGS. 3 to 6 schematically illustrating various operating modes of the hydraulic system 100. The system further comprises a control unit (not shown) configured to control the hydraulic system according to operate in a flow support mode, a power boost mode or a charging mode. The valves 116, 120, 124 can be assumed to be closed as a default position when the accumulator and support hydraulic machine is not being used.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The method comprises controlling S1 the hydraulic system to operate in a flow support mode S2, a power boost mode S3 or a charging mode S4. The flow support mode S2 illustrated in FIG. 3 comprises opening the flow support valve 124, closing the discharge valve 116 and charge valve 120, and operating the support hydraulic machine 112 as a pump to provide a hydraulic flow from the tank 126 to the main pressure line 108. As illustrated by arrow 302, a main hydraulic flow is provided to the main pressure line 108 by the main hydraulic machine 102 acting as a hydraulic pump. The support flow from the tank 126 is illustrated by arrows 304a-c, where the hydraulic fluid is pumped from the tank 126, pressurized by the support hydraulic machine 112 and provided to the main pressure line 108 via the open flow support valve 124. The resulting combined flow to the working hydraulics is illustrated by arrow 306.

The flow support mode S2 is thereby used to provide additional flow from the tank 126 via the support hydraulic machine 112 if the engine 106 is not at full load but where a hydraulic flow requested by the working hydraulics 110 exceeds a maximum possible hydraulic flow of the main hydraulic machine 102. The principle of the flow support mode S2 is thereby to increase of the overall displacement of the hydraulic supply system 100 by operating the main hydraulic machine 102 and the support hydraulic machine 112 unit in parallel. Moreover, since the flow support is provided from the tank 126 via the support hydraulic machine 112 instead of from the accumulator 114 if the engine is below full load, the engine load can be increased towards an optimal working point where the fuel efficiency of the engine 106 is higher.

Figure 4:
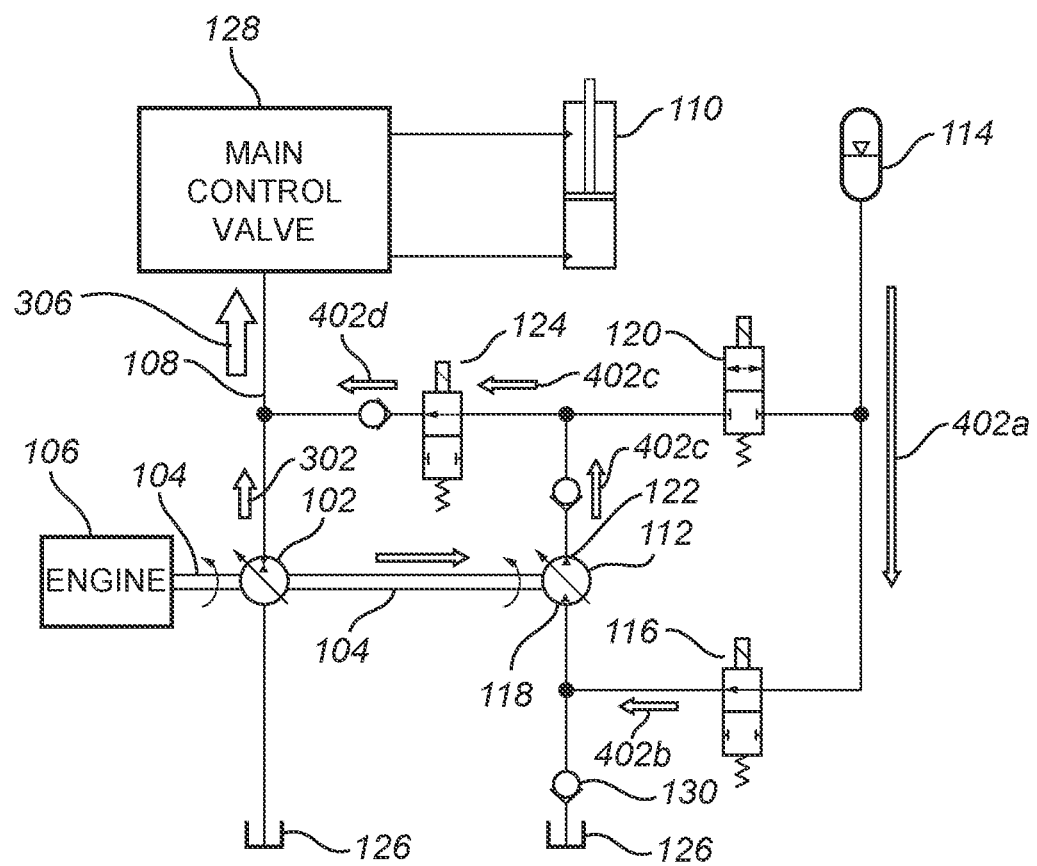
FIG. 4 schematically illustrates an operating mode of a hydraulic system according to an embodiment of the invention.

FIG. 4 schematically illustrates operating the system 100 in the power boost mode S3 which comprises opening the discharge valve 116 and the flow support valve 124 and closing the charge valve 120, and if the pressure on the main hydraulic line 108 is higher than the pressure of the hydraulic accumulator 114, operating the support hydraulic machine 112 as a pump, and if the pressure on the main hydraulic line 108 is lower than the pressure of the hydraulic accumulator 114, operating the support hydraulic machine 112 as a motor. The flow from the hydraulic accumulator 114 to the main pressure line is illustrated by arrows 402a-d. The maximum pressure of the hydraulic accumulator 114 is preferably adapted to the overall expected requirements of the hydraulic system 100.

In the power boost mode, S3, the hydraulic system 100 is provided with additional power from the accumulator 114. As described above, if the system pressure is higher than the accumulator pressure, the support hydraulic unit operates as a pump with the required torque provided on the crankshaft. If the system pressure is lower than the accumulator pressure, the support hydraulic machine operates as a motor providing additional torque on the crankshaft 104. In both cases the hydraulic flow on the output side 122 of the support hydraulic machine 112 is contributed to the main pressure line 108. Accordingly, the described system 100 is capable of providing both power and hydraulic flow from the accumulator 114 to the main pressure line 108. Moreover, by controlling a swivel angle of the support hydraulic machine 112, the boosting power from the accumulator 114 can be controlled proportionally from 0 kW to the maximum boosting power. To make sure that the main hydraulic machine 102 and the support hydraulic machine 112 together provide the requested amount of flow to the main pressure line 108, the swivel angle of the main hydraulic machine 102 adapts to the swivel angle of the support hydraulic machine 112 so that the combined flow 306 equals the requested flow.

Figure 5:
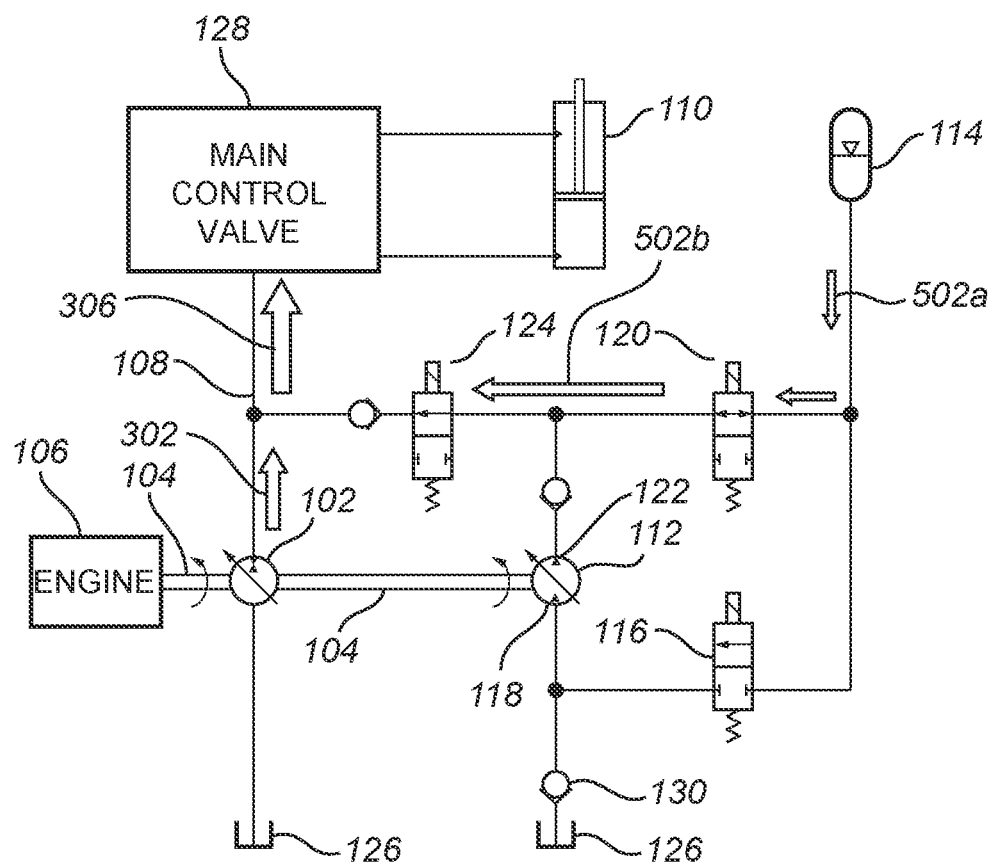
FIG. 5 schematically illustrates an operating mode of a hydraulic system according to an embodiment of the invention.

FIG. 5 illustrates an example embodiment of the power boost mode where a flow is provided directly from the accumulator 114 to the main pressure line, via the charge valve 120 and the flow support valve 124, thereby bypassing the support hydraulic machine 112. This mode of operation is possible when the accumulator pressure is higher than the pressure of the main hydraulic line 108. The charge valve 120 is thereby a bidirectional valve allowing flow in both directions.

Figure 6:
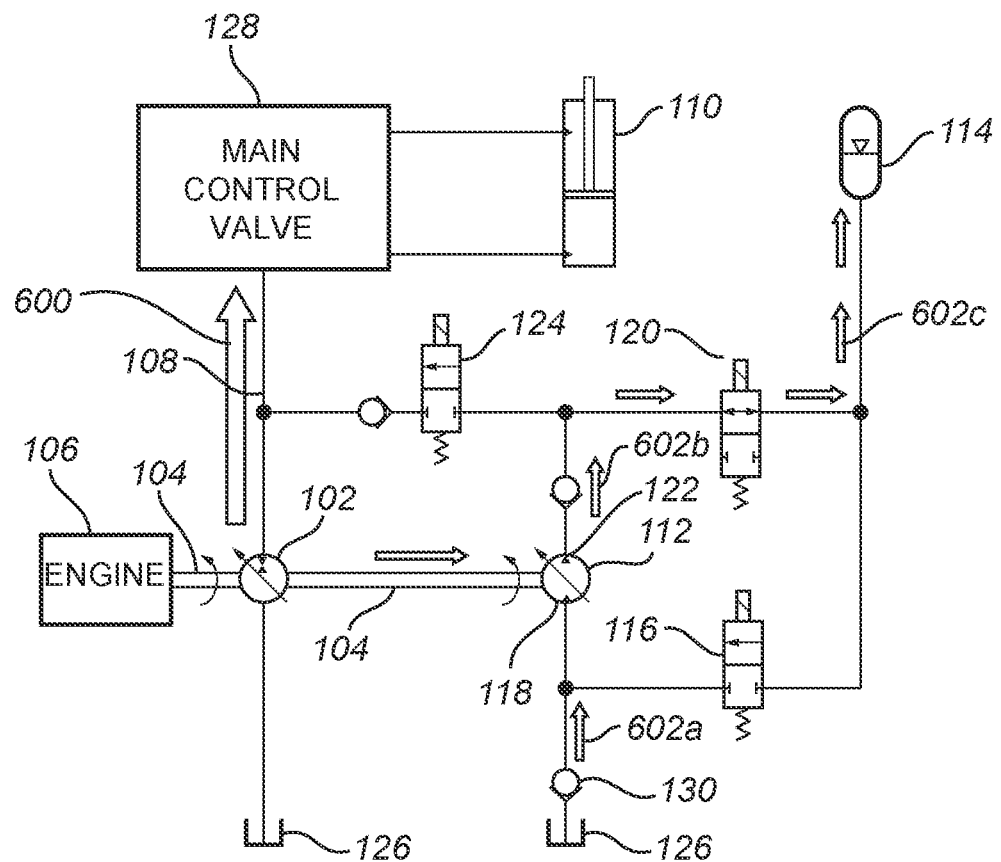
FIG. 6 schematically illustrates an operating mode of a hydraulic system according to an embodiment of the invention.

FIG. 6 schematically illustrates the charging mode S4 which comprises closing the discharge valve 116 and the flow support valve 124 and opening the charge valve 120, and operating the support hydraulic machine 112 as a pump to charge the hydraulic accumulator 114. In the charging mode, all flow to the working hydraulics (if required) is provided by the main hydraulic machine 102 as illustrated by arrow 600. The hydraulic flow from the tank 126 to the hydraulic accumulator 114 is illustrated by arrows 602a-c. The accumulator is advantageously charged during low engine loads via the support hydraulic machine. Since the flow support valve 124 is closed, charging can be performed independently of the system pressure in the main pressure line 108.

By means of the described hydraulic system 100, only the exact amount of energy required for a certain task is taken from the accumulator 114. Moreover, both charging and discharging of the hydraulic accumulator 114 can be performed independent of the system pressure, meaning that no throttling is required. The described system 100 is also well suited for use with other functions for improving fuel efficiency, such as energy recuperation from different functions such as boom, swing or travel.

It is to be understood that the present invention is not limited to the embodiments described above and illustrated in the drawings; rather, the skilled person will recognize that many changes and modifications may be made within the scope of the appended claims.

The invention claimed is:

1. A hydraulic system for a work machine, the system comprising:
   a main hydraulic machine connected to an output shaft of an engine of the work machine, the main hydraulic machine operable as a pump to provide power to the working hydraulics of the work machine and as a motor to regenerate power from the working hydraulics;
   a main pressure line connecting the main hydraulic machine to the working hydraulics;
   a support hydraulic machine connected to the output shaft;
   a hydraulic accumulator;

a discharge valve connected between the accumulator and an input side of the support hydraulic machine;

a charge valve connected between an output side of the support hydraulic machine and the hydraulic accumulator to selectively allow a flow from the support hydraulic machine to the hydraulic accumulator;

a flow support valve connected between the output side of the support hydraulic machine and the main pressure line to selectively allow a flow from the support hydraulic machine to the main pressure line;

a hydraulic tank connected to the input side of the support hydraulic machine; and a control unit configured to control the hydraulic system to operate in a flow support mode, a power boost mode or a charging mode, wherein the flow support mode comprises opening the flow support valve, closing the discharge valve and charge valve, and operating the support hydraulic machine as a pump to provide a hydraulic flow from the tank to the main pressure line;

wherein the power boost mode comprises opening the discharge valve and the flow support valve and closing the charge valve, and if the pressure on the main hydraulic line is higher than the pressure of the accumulator, operating the support hydraulic machine as a pump, and if the pressure on the main hydraulic line is lower than the pressure of the accumulator, operating the support hydraulic machine as a motor; and wherein the charging mode comprises closing the discharge valve and the flow support valve and opening the charge valve, and operating the support hydraulic machine as a pump to charge the accumulator, the control unit further configured to control the hydraulic system to be in the flow support mode if an engine load is lower than a maximum load and when a requested hydraulic flow is higher than a maximum hydraulic flow of the main hydraulic machine.

2. The hydraulic system according to claim 1, wherein the support hydraulic machine is a variable displacement hydraulic machine.

3. The hydraulic system according to claim 1, further comprising a main control valve connecting the main pressure line to the working hydraulics.

4. The hydraulic system according to claim 1, wherein the charge valve is a bidirectional valve, and the discharge valve and flow support valve are unidirectional valves.

5. A vehicle comprising a hydraulic system according to claim 1.

6. The hydraulic system of claim 1, wherein the support hydraulic machine is directly coupled to the output shaft without any intermediate gears or transmission arrangement.

7. A method for controlling a hydraulic system of a work machine, the hydraulic system comprising:

a main hydraulic machine connected to an output shaft of an engine of the work machine, the main hydraulic machine operable as a pump to provide power to the working hydraulics of the work machine and as a motor to regenerate power from the working hydraulics;

a main pressure line connecting the main hydraulic machine to working hydraulics of the work machine;

a support hydraulic machine connected to the output shaft;

a hydraulic accumulator;

a discharge valve connected between the accumulator and an input side of the support hydraulic machine;

a charge valve connected between an output side of the support hydraulic machine and the accumulator to selectively allow a flow from the support hydraulic machine to the accumulator;

a flow support valve connected between the output side of the support hydraulic machine and the main pressure line to selectively allow a flow from the support hydraulic machine to the main pressure line; and a hydraulic tank connected to the input side of the support hydraulic machine, wherein the method comprises:

controlling the hydraulic system to operate in a flow support mode, a power boost mode or a charging mode, wherein the flow support mode comprises opening the flow support valve, closing the discharge valve and charge valve, and operating the support hydraulic machine as a pump to provide a hydraulic flow from the tank to the main pressure line, wherein the power boost mode comprises opening the discharge valve and the flow support valve and closing the charge valve, and if the pressure on the main hydraulic line is higher than the pressure of the hydraulic accumulator, operating the support hydraulic machine as a pump, and if the pressure on the main hydraulic line is lower than the pressure of the hydraulic accumulator, operating the support hydraulic machine as a motor, wherein the charging mode comprises closing the discharge valve and the flow support valve and opening the charge valve, and operating the support hydraulic machine as a pump to charge the hydraulic accumulator, further comprising controlling the hydraulic system to be in the flow support mode if an engine load is lower than a maximum load and when a requested hydraulic flow is higher than a maximum hydraulic flow of the main hydraulic machine.

8. The method according to claim 7, further comprising controlling the hydraulic system to be in the charging mode if a current engine load is lower than a maximum engine load and when a requested hydraulic flow is lower than a maximum hydraulic flow of the main hydraulic machine.

9. The method according to claim 7, wherein operating the hydraulic system in a power boost mode further comprises, if the pressure in the main pressure line is higher than the pressure of the hydraulic accumulator, operating the support hydraulic machine to increase the pressure of hydraulic fluid received from the hydraulic accumulator to the pressure of the main pressure line.

10. The method according to claim 7, wherein operating the hydraulic system in a power boost mode further comprises, if the pressure in the main pressure line is higher than the pressure of the hydraulic accumulator, decreasing a displacement of the main hydraulic machine.

11. The method according to claim 7, wherein operating the hydraulic system in a power boost mode further comprises controlling a power output by the support hydraulic machine by controlling a swivel angle of the support hydraulic machine.

12. The method according to claim 7, further comprising operating the hydraulic system in a start/stop mode, where the discharge valve and the flow support valves are opened and the charge valve is closed, and wherein the support hydraulic machine is operated as a motor propelling the output shaft of the engine to start the engine.

13. A computer program comprising program code means for performing the steps of claim 7 when the program is run on a computer.

14. A computer readable medium carrying a computer program comprising program code means for performing the steps of claim 7 when the program is run on a computer.

\* \* \* \* \*